(12) United States Patent
Hofrichter et al.

(10) Patent No.: US 11,894,190 B2
(45) Date of Patent: Feb. 6, 2024

(54) ELECTRICAL COMPONENT

(71) Applicant: TDK Electronics AG, Munich (DE)

(72) Inventors: Alfred Hofrichter, Hartberg (AT); S. Soran Nabavi, Seiersberg Pirka (AT)

(73) Assignee: TDK Electronics AG, Munich (DE)

( * ) Notice: Subject to any disclaimer, the term of this patent is extended or adjusted under 35 U.S.C. 154(b) by 159 days.

(21) Appl. No.: 17/431,913

(22) PCT Filed: Feb. 14, 2020

(86) PCT No.: PCT/EP2020/053961
§ 371 (c)(1),
(2) Date: Aug. 18, 2021

(87) PCT Pub. No.: WO2020/173727
PCT Pub. Date: Sep. 3, 2020

(65) Prior Publication Data
US 2022/0148805 A1 May 12, 2022

(30) Foreign Application Priority Data
Feb. 28, 2019 (DE) .......................... 102019105116.9

(51) Int. Cl.
*H01G 4/012* (2006.01)
*H01G 4/30* (2006.01)

(52) U.S. Cl.
CPC ............... *H01G 4/012* (2013.01); *H01G 4/30* (2013.01)

(58) Field of Classification Search
CPC .......... H01G 4/012; H01G 4/30; H01G 4/005; H01G 4/008; H10G 4/30; H10G 4/005
(Continued)

(56) References Cited

U.S. PATENT DOCUMENTS 6,163,246 A   12/2000   Ueda et al.
8,947,193 B2   2/2015   Rinner
(Continued)

FOREIGN PATENT DOCUMENTS

CN   103081033 A   5/2013
CN   103797553 A   5/2014
(Continued)

*Primary Examiner* — Arun Ramaswamy
(74) *Attorney, Agent, or Firm* — Slater Matsil, LLP (57) ABSTRACT

In an embodiment, a component includes a first electrode and a second electrode arranged one above the other in a stacking direction, wherein the first electrode and the second electrode overlap in a first overlap region, wherein the first electrode has, in a first region containing the first overlap region, an extent in a first direction perpendicular to the stacking direction that is greater than an extent of the second electrode in the first direction in the first region, and wherein the first electrode has, in the first region containing the first overlap region, an extent in a second direction perpendicular to the stacking direction and to the first direction that is greater than an extent of the second electrode in the second direction in the first region, and a third electrode arranged in the same plane as the second electrode, wherein the first electrode is a floating electrode, wherein the first electrode and the third electrode overlap in a second overlap region, wherein the first electrode has, in a second region that contains the second overlap region, extents in the first direction and in the second direction that are greater than the extents of the third electrode in the first and the second direction in the second region, and wherein the first electrode has, in a connecting region that connects the first region and the second region, an extent in the first direction that is smaller than the extent of the first electrode in the first region and smaller than the extent of the first electrode in the second region.

12 Claims, 5 Drawing Sheets

(58) Field of Classification Search
USPC ............ 361/301.4, 306.3, 321.1, 303, 321.4, 361/321.5, 321.3
See application file for complete search history.

(56) References Cited

U.S. PATENT DOCUMENTS

| | | | |
|---|---|---|---|
| 9,583,262 B2 | 2/2017 | Rinner | |
| 9,779,875 B2 | 10/2017 | Lim et al. | |
| 2001/0002873 A1* | 6/2001 | Tanaka | H01C 7/18 |
| | | | 257/532 |
| 2009/0309691 A1 | 12/2009 | Ito | |
| 2010/0207710 A1* | 8/2010 | Ziegler | H03H 7/425 |
| | | | 333/204 |
| 2011/0037536 A1* | 2/2011 | Kanno | H01G 4/005 |
| | | | 361/306.3 |
| 2011/0309895 A1* | 12/2011 | Ahn | H03H 7/01 |
| | | | 333/185 |
| 2013/0100576 A1* | 4/2013 | Seo | H01G 4/12 |
| | | | 361/301.4 |
| 2016/0111216 A1* | 4/2016 | Lee | H01G 4/232 |
| | | | 361/301.4 |
| 2016/0196917 A1 | 7/2016 | Lim et al. | |

FOREIGN PATENT DOCUMENTS

| | | | |
|---|---|---|---|
| CN | 105761933 A | 7/2016 | |
| DE | 10028014 A1 | 3/2001 | |
| DE | 102006013227 A1 | 5/2007 | |
| DE | 102010044856 A1 | 3/2012 | |
| DE | 102011113496 A1 | 3/2013 | |
| JP | H11224805 A | 8/1998 | |
| TW | M565389 U | 8/2018 | |
| WO | 2007054082 A1 | 5/2007 | |

* cited by examiner

ELECTRICAL COMPONENT

This patent application is a national phase filing under section 371 of PCT/EP2020/053961, filed Feb. 14, 2020, which claims the priority of German patent application 102019105116.9, filed Feb. 28, 2019, each of which is incorporated herein by reference in its entirety.

TECHNICAL FIELD

The present invention relates to a component. The component is, in particular, an electrical component that has overlapping electrodes.

BACKGROUND

In electrical components, in particular in thermistors, varistors or capacitors, electrical properties are defined by an area of an overlap region between electrodes. These electrical properties may be, for example, a resistance or a capacitance of the component. Unavoidable tolerances during manufacture of the component may result in inaccuracies in the shape, size and/or positioning of the electrodes. In this case, the manufacturing tolerances may lead to the area of the overlap region between the electrodes being changed and as a result the abovementioned electrical properties of the component being influenced in an undesirable manner. In manufacturing technology, efforts are continually being made to reduce inaccuracies in the manufacture of electrodes by improving the methods used.

SUMMARY

Embodiments provide an improved component that is less sensitive to manufacturing inaccuracies.

Embodiments provide a component that has a first electrode and a second electrode which are arranged one above the other in a stacking direction, wherein the first electrode and the second electrode overlap in an overlap region, wherein the first electrode has, in a region that contains the overlap region, an extent in a first direction, which is perpendicular to the stacking direction, that is greater than an extent of the second electrode in the region.

Accordingly, the first electrode can project beyond the second electrode beyond the overlap region in the first direction. In this case, the first electrode can preferably project beyond the second electrode both in the first direction and in a negative first direction which is opposite to the first direction.

Accordingly, an area of the overlap region cannot be influenced by tolerances in the manufacture of the first electrode, at least in respect of the extent of the first electrode in the first direction. Manufacturing tolerances that lead to small inaccuracies in the positioning of the first electrode and the second electrode in the first direction do not change the area of the overlap region either since, in the event of the first and the second electrode shifting relative to one another in the first direction by a distance that is smaller than the projection of the first electrode beyond the second electrode in the first direction, the area of the overlap region is not changed.

Since a large number of electrical properties, such as a resistance and a capacitance for example, depend directly on the area of the overlap region, and since the variations in the area of the overlap region are reduced as a result of manufacturing tolerances on account of the configuration of the electrodes, a component of which the electrical properties are insensitive to tolerances in the manufacture of the electrodes can be created. For structural reasons, the component can be configured such that neither small shifts in the position of the electrodes nor inaccuracies in the shape and size of the electrodes influence the area of the overlap region.

Tolerances in the manufacture of electrodes may arise, for example, in the process steps of printing the electrodes or the stack of layers one over the other.

The extent of the first and, respectively, the second electrode can in each case be considered to be a maximum extent of the respective electrode in the first direction. In this case, the first direction can indicate a width of the electrodes. The first direction can run parallel to an edge of the component.

The first electrode can have, in the region, an extent in a second direction, which is perpendicular to the stacking direction and to the first direction, that is greater than the extent of the second electrode in the region. The extent of the first electrode in the second direction can be a length of the first electrode. The extent of the second electrode in the second direction can be a length of the second electrode.

In this case, the first electrode can project beyond the second electrode preferably beyond the overlap region in the second direction and in a negative second direction which is opposite to the second direction.

In addition, manufacturing tolerances in the positioning of the electrodes in the second direction cannot influence the area of the overlap region if the first electrode has, in the region, an extent in the second direction that is greater than the extent of the second electrode in the region. Manufacturing tolerances in respect of the size of the first electrode in the second direction likewise cannot have an effect on the area of the overlap region. Accordingly, the component can be more insensitive to manufacturing tolerances.

Therefore, a component can be provided in which the first and the second electrode can be arranged and configured in such a way that the area of the overlap region remains unchanged, even if the electrodes are shifted in the first and/or second direction on account of manufacturing tolerances and if there are variations in the size of the first electrode. Since the area of the overlap region influences electrical properties of the component, electrical properties of the component can be less sensitive to manufacturing tolerances.

As an alternative, the first electrode can have, in the region, an extent in a second direction, which is perpendicular to the stacking direction and to the first direction, that is smaller than an extent of the second electrode in the region.

In this case, the second electrode can project beyond the first electrode preferably beyond the overlap region in the second direction and the negative second direction which is opposite to said second direction. The electrode can provide a component of which the electrical properties are insensitive to manufacturing tolerances with a configuration of this kind too.

The first electrode or the second electrode can be a floating electrode. Accordingly, it is possible for the first electrode or the second electrode to not be connected to an outer electrode. A floating electrode can be completely surrounded by ceramic material.

The component can have an outer electrode which is connected to the first or the second electrode. In one embodiment, the component can have a first outer electrode which is connected to the first electrode, and a second outer electrode which is connected to the second electrode. Accordingly, the electrodes may be inner electrodes.

The first electrode and/or the second electrode can be structured by way of holes and/or recesses. As an alternative or in addition, the first electrode and/or the second electrode can have a thickness that varies in a direction perpendicular to the outer electrode. In particular, the thickness of the electrodes can decrease in the direction of the interior of the component. Electrode material can be saved by way of varying the thickness and/or by way of structuring the electrodes. A saving in material is of considerable significance, particularly in the case of electrodes that contain silver. The direction perpendicular to the outer electrode may be the second direction mentioned above.

The component can further have a third electrode which is arranged in the same plane as the first electrode. The third electrode and the first electrode can overlap in a further overlap region, wherein the first electrode has, in a region that contains the further overlap region, an extent in the first direction that is greater than an extent of the third electrode in the region. As an alternative, the third electrode could have, in the region, a greater extent in the first direction than the first electrode. Accordingly, manufacturing tolerances have little effect on the electrical properties of the component in respect of the relative position of the first and the third electrode.

In one embodiment, the first electrode is a floating electrode, wherein the first electrode and the third electrode overlap in a further overlap region, wherein the first electrode has, in the region that contains the overlap region, an extent in a second direction, which is perpendicular to the stacking direction and to the first direction, that is greater than an extent of the second electrode in the second direction in the region, wherein the first electrode has, in a further region that contains the further overlap region, extents in the first direction and in the second direction that are greater than the extents of the third electrode in the first and the second direction in the region, and wherein the first electrode has, in a connecting region that connects the region and the further region, an extent in the first direction that is smaller than the extent of the first electrode in the region and smaller than the extent of the first electrode in the further region.

The component can be a multilayer component that has a plurality of first electrodes and a plurality of second electrodes. The first and the second electrodes can respectively be configured like the first and, respectively, the second electrode discussed above. The first and the second electrodes can be arranged alternately one above the other in the stacking direction. The first electrodes and the second electrodes can overlap in the overlap region, wherein the first electrodes have, in the region that contains the overlap region, an extent in the first direction that is greater than the extent of the second electrode in the region. The further structural and functional properties that have been described in connection with the first and the second electrode of the component can also apply to the first electrodes and the second electrodes of the multilayer component.

In one embodiment, the component can have a plurality of third electrodes, wherein each third electrode is arranged in a plane with a second electrode. Each first electrode can overlap one of the second electrodes in an overlap region and one of the third electrodes in a further overlap region. In this case, the extents of the first electrode and the respective second electrode or the first electrode and the respective third electrode can differ from one another in at least one direction in a region that contains the overlap region or the further overlap region.

The component can have a ceramic layer that is arranged between the first and the second electrode. As an alternative, the component can have a dielectric layer that is arranged between the electrodes. The layer between the first and the second electrode can contain a varistor material. As an alternative, the layer between the electrodes can contain a material that has NTC properties.

The component may be a capacitor. In particular, it may be a ceramic multilayer capacitor. In a capacitor, a capacitance depends on the overlap region between the respective electrodes. Therefore, it is advantageous to construct the capacitor in such a way that the area of the overlap region is insensitive to manufacturing tolerances since, in this case, the capacitance is also insensitive to manufacturing tolerances.

The component may be a thermistor. In particular, it may be an NTC thermistor. As an alternative, the component may be a varistor, in particular a multilayer varistor. The component may be a component that is intended to be surface-mounted (SMD; Surface Mount Device).

BRIEF DESCRIPTION OF THE DRAWINGS

Preferred embodiments of the component will be described below with reference to the figures.

DETAILED DESCRIPTION OF ILLUSTRATIVE EMBODIMENTS

Figure 1:
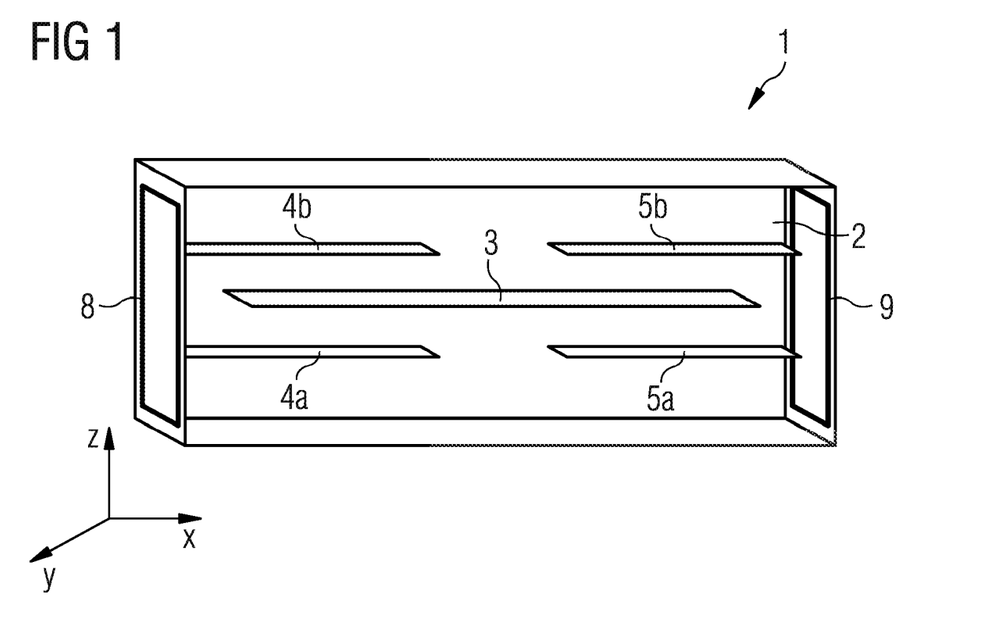
FIG. 1 shows a perspective view of a component according to a first exemplary embodiment.
Figure 2:
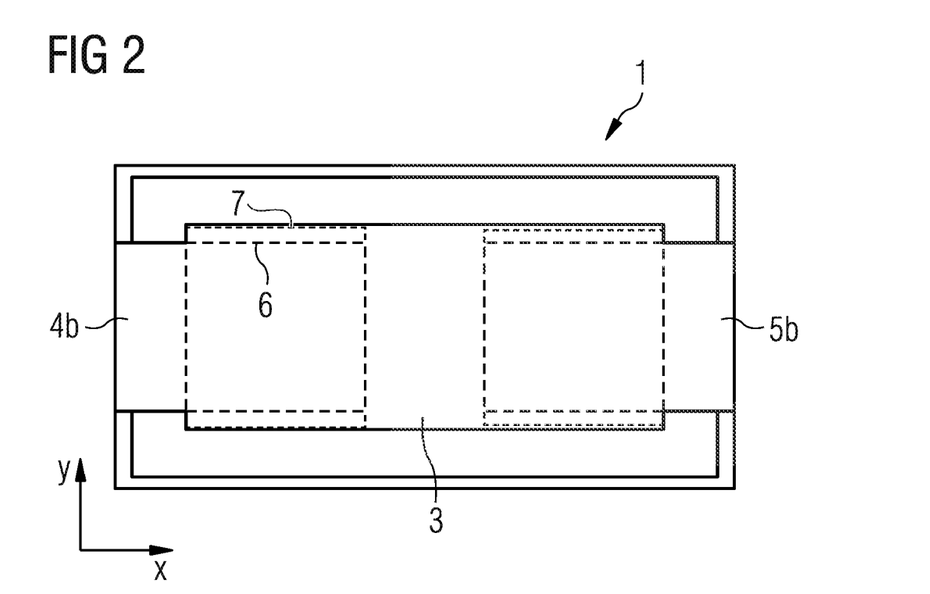
FIG. 2 shows a plan view of the component.

FIG. 1 shows a perspective view of a component 1 according to a first exemplary embodiment. FIG. 2 shows a plan view of the component 1.

The component 1 is a multilayer component. The component 1 has layers of a ceramic material 2 and electrode layers, wherein the layers of the ceramic material 2 and the electrode layers are arranged alternately one above the other in a stacking direction z.

The component 1 is a thermistor. In particular, it is an NTC thermistor (NTC=Negative Temperature Coefficient; thermistor).

The component 1 has a first electrode 3 which is a floating electrode. The component 1 further has two second electrodes 4a, 4b which are each connected to a first outer electrode 8. The component 1 has two third electrodes 5a, 5b which are each connected to a second outer electrode 9 that is situated opposite the first outer electrode 8. The first electrode 3, the second electrodes 4a, 4b and the third electrodes 5a, 5b are each inner electrodes.

In each case one of the second electrodes 4a and one of the third electrodes 5a are arranged in a lowermost electrode layer in the stacking direction z. The second electrode 4a and the third electrode 5a are not electrically connected to one another, but rather are separated from one another by ceramic material 2. The first electrode 3, which is designed as a floating electrode and is not in contact with one of the outer electrodes 8, 9, is arranged in a middle electrode layer. A topmost electrode layer is of identical configuration to the lowermost electrode layer and accordingly contains one of the second electrodes 4b and one of the third electrodes 5b.

One of the second electrodes 4a and the first electrode 3 will initially be taken into consideration below. The second electrode 4a and the first electrode 3 overlap in an overlap region 6, as shown in the plan view of FIG. 2 in particular. In a first direction y, which is perpendicular to the stacking direction z, the first electrode 3 has a greater extent than the second electrode 4a. In this case, the first electrode 3 has, in a region 7 that comprises the overlap region 6, a greater extent in the first direction y than the second electrode 4a. The extent of the respective electrodes 3, 4a in the first direction y is a width of the respective electrode 3, 4a. The first electrode 3 therefore projects beyond the second electrode 4a beyond the overlap region 6 in the first direction y. In the region 7 that comprises the overlap region 6, the first electrode 3 is wider than the second electrode 4a.

In this case, the first electrode 3 has, in the region 7 that contains the overlap region 6, a greater extent in the first direction y and in the negative first direction −y which is directly opposite the first direction. In other words, in this case, the first electrode 3 projects beyond the second electrode 4a beyond the overlap region 6 both in the positive first direction +y and in the negative first direction −y.

Tolerances in the accuracy of manufacture of the electrodes 3, 4a are unavoidable during manufacture of the component 1. If, owing to the manufacturing tolerances, the size of the area of the overlap region 6 between the first and second electrodes 3, 4a is changed, electrical properties of the component 1 that depend on the size of the area of the overlap region 6 can be considerably changed.

In the component 1 according to the first exemplary embodiment, the first and the second electrode 3, 4a are configured and arranged in such a way that a tolerance in the width of the first electrode 3 and a tolerance in the positioning of the first and the second electrode 3, 4a in the first direction y have no effect on the size of the area of the overlap region 6. Accordingly, the electrical properties are insensitive to manufacturing tolerances in the width of the first electrode 3 and to manufacturing tolerances in the positioning of the electrodes 3, 4a relative to one another in the first direction y. Therefore, these parameters of the manufacturing tolerances cannot undesirably influence the electrical properties of the component 1 that depend on the area of the overlap region 6.

The second of the second electrodes 4b is structurally identical to the first of the second electrodes 4a described above. Accordingly, the first electrode 3 therefore projects beyond the second of the second electrodes 4b likewise beyond the overlap region in the first direction. Accordingly, as discussed above in connection with the first of the second electrodes 4a, electrical properties of the component 1 that depend on the overlap region between the first electrode 3 and the second of the second electrodes 4b cannot be undesirably influenced by manufacturing tolerances in the width of the first electrode 3 and by manufacturing tolerances in the positioning of the electrodes 3, 4b relative to one another in the first direction y.

The third electrodes 5a, 5b are substantially structurally identical to the second electrodes 4a, 4b. The third electrodes 5a, 5b likewise respectively overlap the first electrode 3 in a further overlap region 6. In this case, the first electrode 3 has a greater extent than each of the third electrodes 5a, 5b in the first direction y. Accordingly, the electrical properties of the component 1 are insensitive to manufacturing tolerances in respect of the relative position of the first electrode 3 and the third electrodes 5a, 5b in the first direction y.

Figure 3:
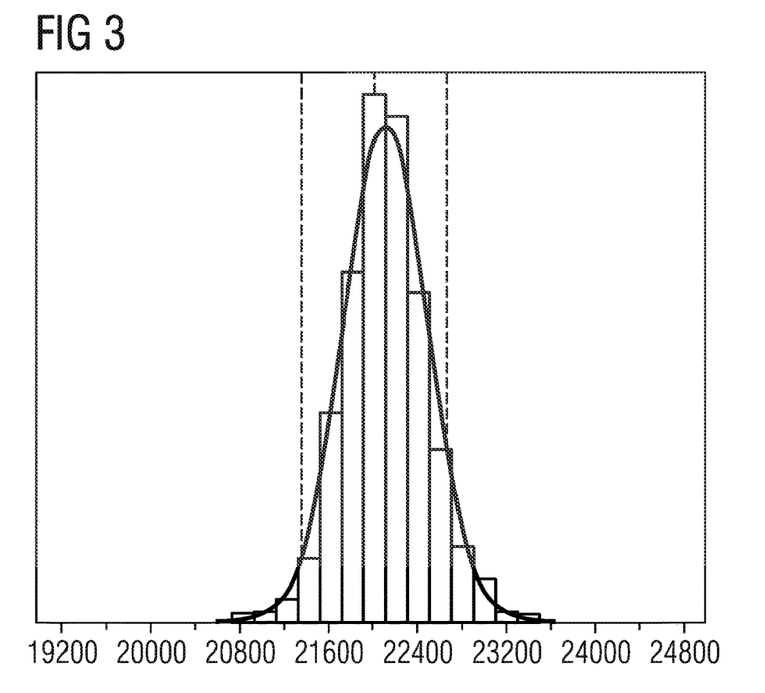
FIG. 3 shows results of a resistance measurement at a temperature of 25° C. on a large number of components according to the first exemplary embodiment.

FIG. 3 shows results of a resistance measurement at a temperature of 25° C. on a large number of components 1 according to the first exemplary embodiment, as shown in FIGS. 1 and 2. Components 1 of the size 0805 have been used here. The resistance at 25° C. is plotted on a horizontal axis and the number of components 1, in the case of each of which a resistance of this kind has been measured, is plotted on a vertical axis.

Figure 4:
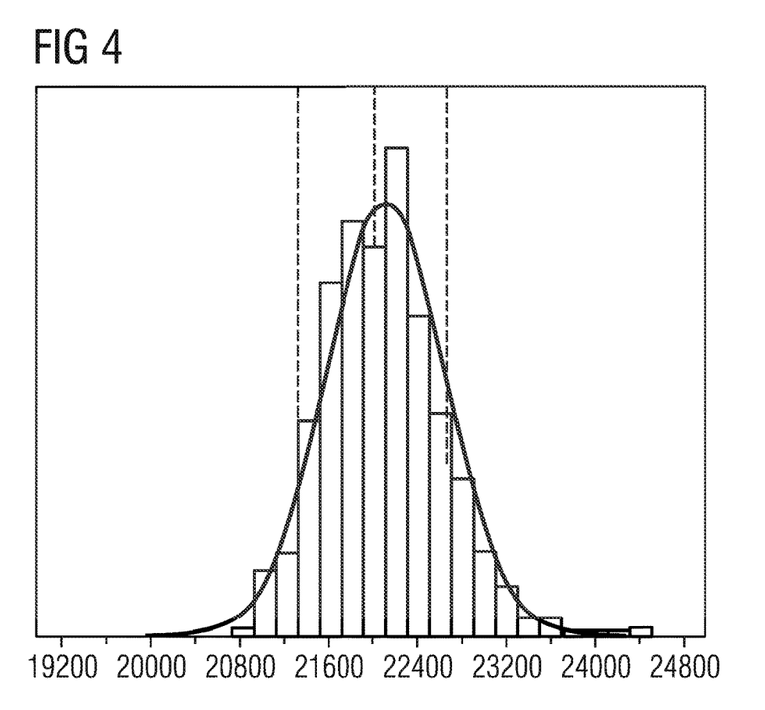
FIG. 4 shows the results of a comparison measurement.

FIG. 4 shows the results of a comparison measurement of a resistance at a temperature of 25° C. that was taken on a large number of comparison components. The comparison components differ from the component 1 shown in FIGS. 1 and 2 in that, in the case of the comparison components, the first electrode, the second electrodes and the third electrodes each have the same extent in the first direction y. The comparison components are likewise of the size 0805.

Comparison of FIGS. 3 and 4 shows that a standard deviation in the resistance at the temperature of 25° C. in the case of the components according to the first exemplary embodiment is smaller than in the case of the comparison components. The reduction in the standard deviation can be attributed to manufacturing tolerances changing the areas of the overlap regions 6 to a lesser extent on account of the configuration of the electrodes 3, 4a, 4b, 5a, 5b and therefore the electrical properties, here the resistance at 25° C., not being influenced by the manufacturing tolerances.

Figure 5:
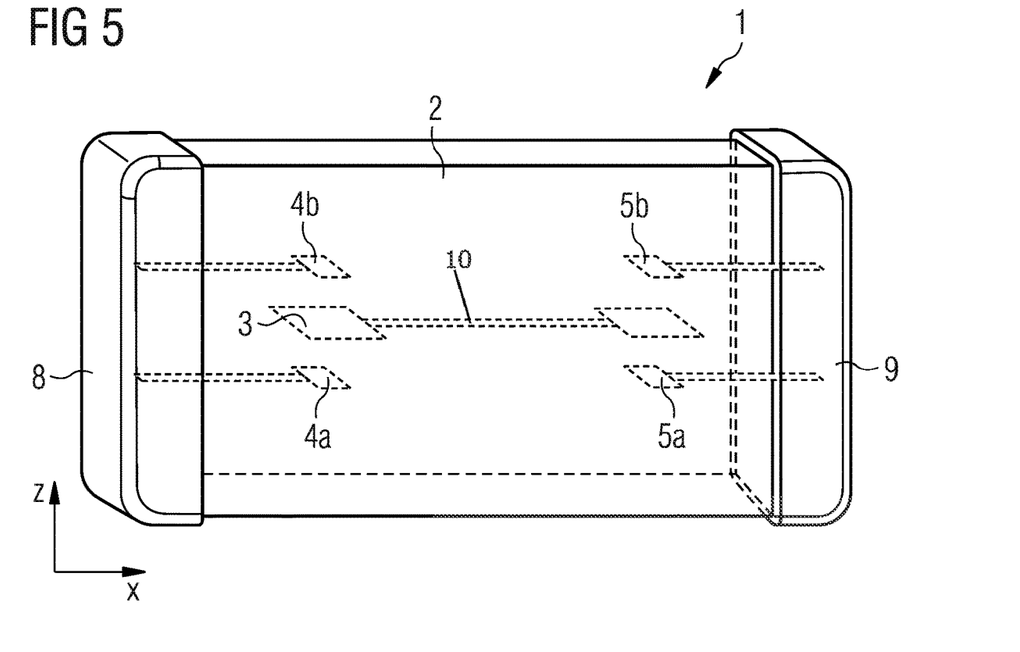
FIG. 5 shows a perspective view of a component according to a second exemplary embodiment.
Figure 6:
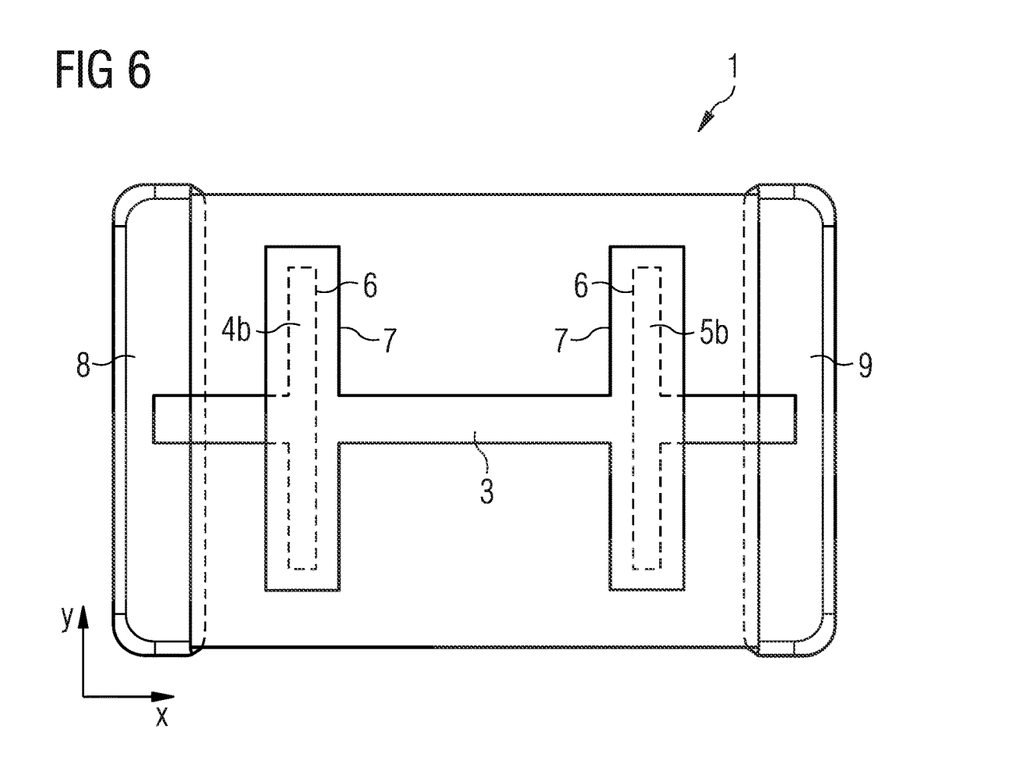
FIG. 6 shows a plan view of the component.

FIGS. 5 and 6 show a component 1 according to a second exemplary embodiment. FIG. 5 shows a perspective view of the component 1, and FIG. 6 shows a plan view.

The component 1 according to the second exemplary embodiment is likewise an NTC thermistor. It is a multilayer component.

The component 1 has in addition to layers composed of a ceramic material 2 and electrode layers which are arranged alternately one above the other in the stacking direction z. Like the component 1 according to the first exemplary embodiment, the component according to the second exemplary embodiment also has first, second and third electrodes 3, 4a, 4b, 5a, 5b.

The first electrode 3 is a floating electrode. The second electrodes 4a, 4b are connected to a first outer side and a first outer electrode 8 that is arranged on the first outer side. The third electrodes 5a, 5b are connected to a second outer side and a second outer electrode 9 that is arranged on the second outer side.

The first electrode 3 overlaps the second electrodes 4a, 4b in an overlap region 6 and the third electrodes 5a, 5b in a further overlap region 6.

The first electrode 3 is H-shaped.

The first electrode 3 has, in a region 7 that comprises the overlap region 6, an extent that is greater than the extent of the second electrode 4a, 4b in the first direction y. The first electrode 3 further has, in the region 7 that comprises the overlap region 6, an extent in a second direction x that is greater than the extent of the second electrode 4a, 4b in the second direction x, wherein the first direction y and the second direction x are each perpendicular to the stacking direction z and perpendicular to one another.

The extent in the second direction x can also be referred to as the length of the respective electrode. The first electrode 3 is therefore longer and wider than the second electrodes 4a, 4b in the region 7 that comprises the overlap region 6. The first electrode 3 projects beyond the second electrodes 4a, 4b beyond the overlap region 6 in the first and the second direction y, x. In this case, the first electrode 3 projects beyond the second electrodes 4a, 4b both in the positive and the negative first direction as well as in the positive and the negative second direction.

Accordingly, the area of the overlap region 6 in which the first electrode 3 overlaps the second electrodes 4a, 4b is not influenced by tolerances in the extent of the first electrode 3 in the first direction y and the second direction x. Like in the case of the first exemplary embodiment, the influence of the manufacturing tolerances on the electrical properties of the component 1 can therefore be reduced. Since neither tolerances in the length nor in the width of the first electrode 3 now influence the area of the overlap region, the electrical properties of the component according to the second exemplary embodiment are even more insensitive to manufacturing tolerances. Even manufacturing tolerances in the positioning of the electrodes 3, 4a, 4b in the first direction and in the second direction do not influence the area of the overlap region.

The third electrodes 5a, 5b are of substantially structurally identical configuration to the second electrodes 4a, 4b. In particular, the first electrode 3 also has a greater extent in the first and the second direction y, x than the third electrodes 5a, 5b in the region 7 that comprises the further overlap region 6. Accordingly, the first electrode 3 projects beyond the third electrodes 5a, 5b beyond the overlap region 6 in the first and the second direction y, x.

The first electrode 3 further has a connecting region 10 that connects the region 7 that contains the overlap region 6 with the second electrode 4a, 4b and the region 7 that contains the further overlap region 6 with the third electrode 5a, 5b. In the connecting region 10, the first electrode has an extent in the first direction y that is smaller than extent of the first electrode 3 in the region 7 that contains the overlap region 6 with the second electrode 4a, 4b, and is smaller than the extent of the first electrode 3 in the region 7 that contains the further overlap region 6 with the third electrode 5a, 5b. This produces the H shape of the first electrode 3. The extent in the first direction y can be referred to as the width of the electrode.

In an alternative exemplary embodiment, the second and the third electrodes 4a, 4b, 5a, 5b could have greater extents than the first electrode 3 in the first and/or the second direction y, x and project beyond the first electrode 3 beyond the overlap region 6.

Figure 7:
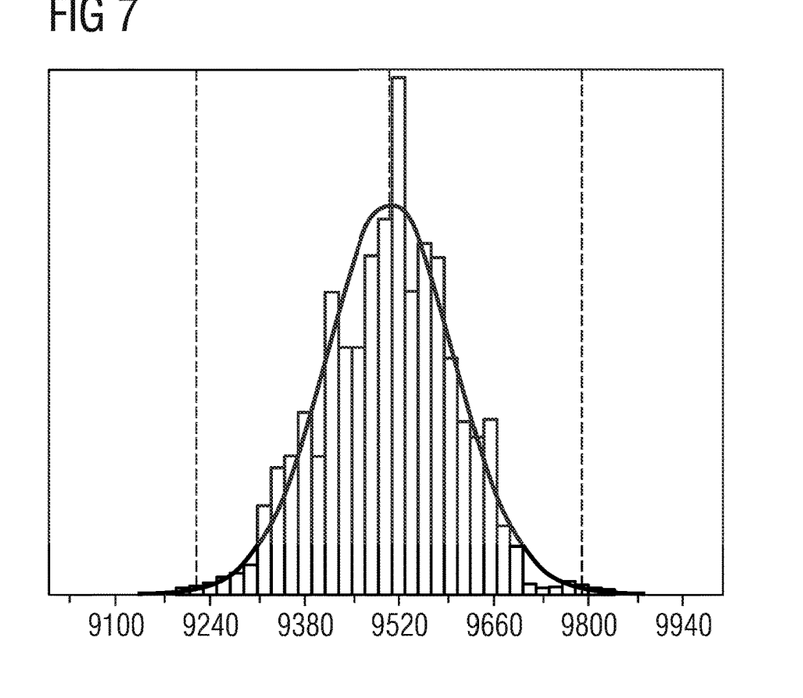
FIG. 7 shows results of a resistance measurement at a temperature of 25° C. on a large number of components according to the second exemplary embodiment.
Figure 8:
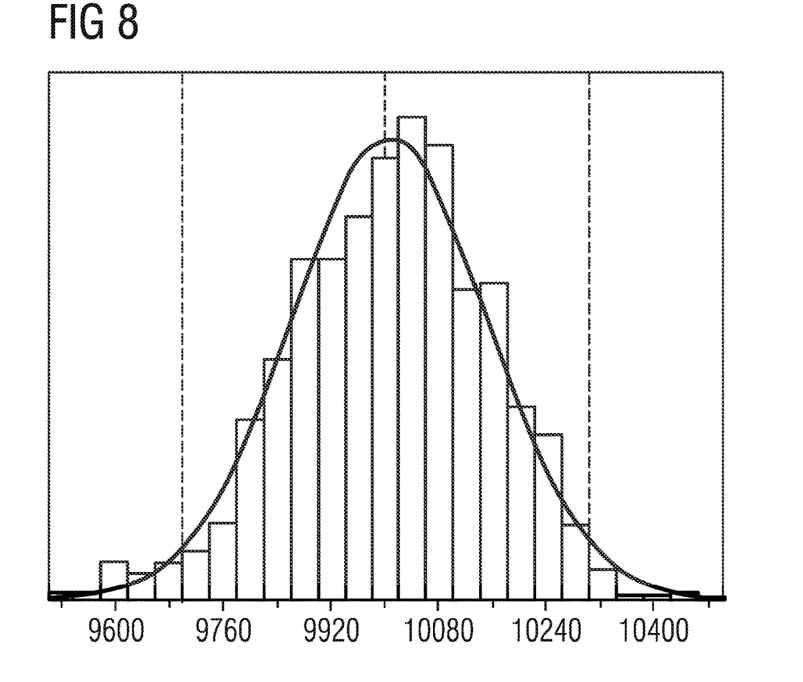
FIG. 8 shows the results of a comparison measurement.

FIG. 7 shows results of a resistance measurement at a temperature of 25° C. on a large number of components 1 according to the second exemplary embodiment. Components of the size 0805 were used here. FIG. 8 shows results of a comparison of measurement of a resistance at a temperature of 25° C. which was taken on a large number of comparison components. The comparison components differ from the component 1 shown in FIGS. 5 and 6 in that, in the case of the comparison components, the first electrode, the second electrodes and the third electrodes each have the same extent in the first direction y and the second direction z. The comparison components are likewise of the size 0805.

Comparison of FIGS. 7 and 8 shows that a standard deviation in the resistance at the temperature of 25° C. in the case of the components 1 according to the second exemplary embodiment is smaller than in the case of the comparison components. The reduction in the standard deviation can be attributed to manufacturing tolerances in the width and the length of the first electrode 3 and manufacturing tolerances in the positioning of the electrodes 3, 4a, 4b, 5a, 5b in the first and the second direction not changing the area of the overlap region 6 and therefore the electrical properties, here the resistance at 25° C., not being influenced by the manufacturing tolerances on account of the configuration of the electrodes 3, 4a, 4b, 5a, 5b.

Figure 9:
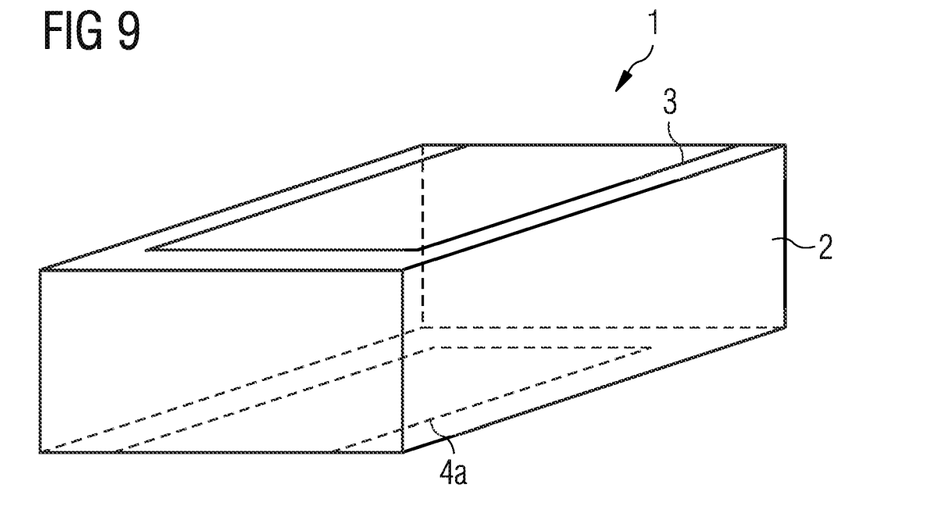
FIG. 9 shows a perspective view of a component according to a third exemplary embodiment.
Figure 10:
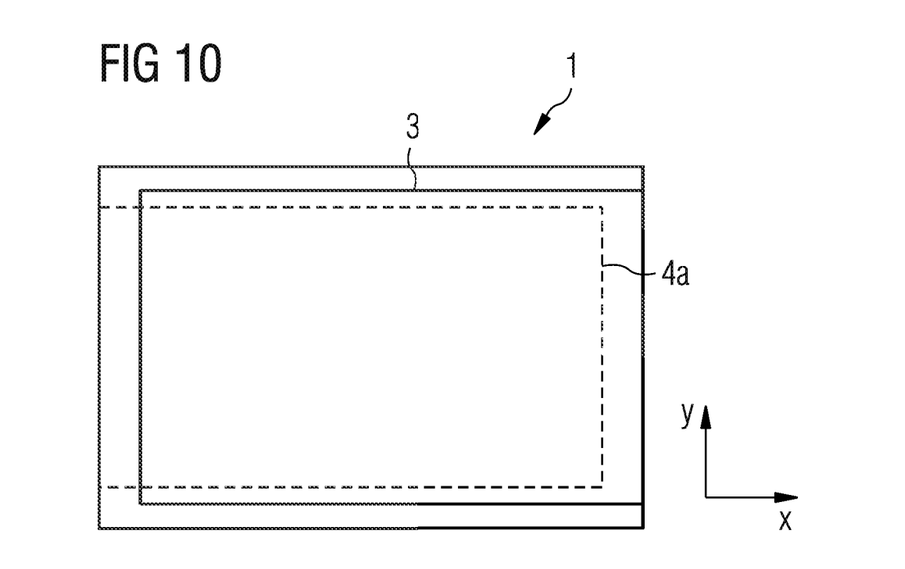
FIG. 10 shows a plan view of the component.

FIGS. 9 and 10 show a component 1 according to a third exemplary embodiment. FIG. 9 shows a perspective view and FIG. 10 shows a plan view of the component 1.

The component 1 is a capacitor. It is an insert capacitor in which a first electrode 3 is arranged on a top side of the capacitor and a second electrode 4a is arranged on the bottom side of the capacitor. A layer of a ceramic material 2 is arranged between the electrodes.

The first electrode 3 has an extent in the first direction y that is greater than the extent of the second electrode 4a in the first direction. Accordingly, the first electrode 3 projects beyond the second electrode 4a beyond the overlap region 6 in the first direction y. As a result, tolerances in the manufacturing process that relate to the extent of the first electrode 3 in the first direction y or the positioning of the electrodes 3, 4a in the first direction y do not have an effect on the area of the overlap region 6 and therefore do not have an effect on electrical properties of the capacitor, e.g. the capacitance.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A component comprising:
   a first electrode and a second electrode arranged one above the other in a stacking direction; and
   a third electrode arranged in the same plane as the second electrode,
   wherein the first electrode is a floating electrode,
   wherein the first electrode comprises a rectangular part in which the first electrode has a constant extent in a first direction and in a second direction, each of the first direction and the second direction being perpendicular to the stacking direction and the first direction and the second direction being perpendicular to each other,
   wherein the second electrode comprises a rectangular part in which the second electrode has a constant extent in the first direction and in the second direction,
   wherein the rectangular part of the first electrode and the rectangular part of the second electrode overlap in a first overlap region,
   wherein the rectangular part of the first electrode protrudes over the rectangular part of the second electrode in both of the first direction and the second direction,
   wherein the third electrode comprises a rectangular part in which the third electrode has a constant extent in the first direction and in the second direction,
   wherein the rectangular part of the first electrode and the rectangular part of the third electrode overlap in a second overlap region, and
   wherein the rectangular part of the first electrode protrudes over the rectangular part of the third electrode in both of the first direction and the second direction.

2. The component according to claim 1, wherein the first electrode has a thickness that varies along a direction perpendicular to a first outer electrode and a second outer electrode of the component.

3. The component according to claim 1, wherein the first electrode is structured by way of recesses and/or holes.

4. The component according to claim 1, wherein the second electrode has a thickness that varies along a direction perpendicular to a second outer electrode of the component.

5. The component according to claim 1, wherein the second electrode is structured by way of recesses and/or holes.

6. The component according to claim 1,
wherein the component is a multilayer component which has a plurality of first electrodes and a plurality of second electrodes which are arranged alternately one above the other in the stacking direction,
wherein the first electrodes and the second electrodes overlap in the first overlap region, and
wherein the first electrodes have, in a region that contains the first overlap region, an extent in the first direction that is greater than the extent of the second electrode in the first region in the region.

7. The component according to claim 1, further comprising a layer of a ceramic material arranged between the first electrode and the second electrode.

8. The component according to claim 1, wherein the component is a capacitor.

9. The component according to claim 1, wherein the component is a thermistor.

10. The component according to claim 1, wherein the component is a varistor.

11. The component according to claim 1, wherein the first electrode is H-shaped.

12. The component according to claim 1,
wherein the second electrode is T-shaped, and
wherein the third electrode is T-shaped.

* * * * *